United States Patent [19]
Keech

[11] 3,939,333
[45] Feb. 17, 1976

[54] PREVIOUS EVENTS MEMORY

[75] Inventor: Eugene Elwin Keech, Santa Ana, Calif.

[73] Assignee: Electronic Engineering Co. of California, Santa Ana, Calif.

[22] Filed: Aug. 9, 1974

[21] Appl. No.: 495,949

[52] U.S. Cl. .................. 235/153 AP; 235/92 CC
[51] Int. Cl.² .................. H03K 21/30; H03K 5/18
[58] Field of Search .. 235/153 AP, 153 AC, 92 CC, 235/92 PL, 92 CA; 328/49

[56] References Cited
UNITED STATES PATENTS

| | | | |
|---|---|---|---|
| 3,504,290 | 3/1970 | Earle | 235/92 CC |
| 3,686,634 | 8/1972 | Malchman et al. | 235/92 CC |
| 3,733,472 | 5/1973 | Taisne | 235/153 AP |
| 3,808,407 | 4/1974 | Ratz | 235/92 CC |

Primary Examiner—Charles E. Atkinson
Attorney, Agent, or Firm—Harry R. Lubcke

[57] ABSTRACT

The method of storing, without interruption, digital signals having asynchronous transitions and reproducing these digital signals upon an expanded time scale after the occurrence of a fault.

The apparatus comprises an input counter, an output counter, an adder operated to subtract, and a latched gate by which the adder stops the output counter when the outputs of the two counters are equivalent. The least-significant-bit of the output counter comprises the output signal, which is stored in a register. A second register simultaneously stores an output from the adder which signifies that more than one pulse is stored in the input counter. After occurrence of a fault the data in the two registers are combined in a modulator for display on an oscilloscope. A complete unit typically includes several channels for simultaneous display; each channel including the apparatus described above.

8 Claims, 4 Drawing Figures

PREVIOUS EVENTS MEMORY

BACKGROUND OF THE INVENTION

This invention pertains to measuring, testing and sensing electricity per se; automatic, digital, and with energy storage.

Various devices in current digital art employ adders, counters, gates and shift registers, or some of these, to process digital information. The combinations of such elements and the purposes for which the combinations are made are rather extensive.

Accordingly, fragmentary combinations from one device in the art may duplicate the fragmentary combination of another device, regardless of the fact that the functioning and purpose of one device may be far removed from that of another device.

One embodiment of the art has been formed to convert a particular digital code arising from altimeter apparatus to another code, and concomitantly to provide a flickerless read-out display of altitude.

The digital input rate from the altimeter apparatus is a predetermined value set by the designer. Acceptance of incoming digital data is repeatedly interrupted in order to reduce flicker of the readout display. The objective of the whole apparatus is to accomplish an "integrated," or averaged, display that is devoid of jitter in changing from one digit to another.

The apparatus stops upon a state of equality being reached between the output of the Gray-to-binary converter and the output of the binary ripple counter, regardless of the number of transitions that have occurred in the incoming data.

Another embodiment of the art has been formed by employing a considerable amount of digital apparatus for the sole purpose of inhibiting flutter in a numerical display.

A comparison gate is an "exclusive-OR" circuit. The transmission of digital information is inhibited upon the occurrence of different polarities of the least significant bit, indicating an odd numbered numerical change. An "up-dating" function occurs at a relatively slower rate and allows the display of odd numbered numerals with delay, thereby inhibiting fluttering of the display.

Still another embodiment of the art has been formed to provide a non-flutter display by an averaging technique. An adder sums the outputs of two registers. The circuit is employed for calculation purposes. The adder contributes an averaging of numerical values.

The present-day market-place affords certain embodiments within the general scope of the art involved.

One such device detects random logic pulses of very short duration. However, a "latch" feature is involved; the use of which in this device requires resetting, with a consequent loss of incoming information during the rest time, during reset. The latch cannot store more than a single incoming pulse before transferring it into longer storage for subsequent display.

BRIEF SUMMARY OF THE INVENTION

The invention involves the method of storing, without interruption, digital signals having transitions. Equivalence between an input and an output count of the transitions prevents the advance of the output count until a new advance of the input count. The lowest order of output count is stored continuously until the occurrence of a fault. After the fault the stored signals are recirculated, including that portion of the input signal containing the abnormality. That portion is subsequently displayed for visual analysis under the control of the operator.

The invention does not have to do with flickerless read-out displays, nor is incoming digital information lost during a latch-reset operation. Several incoming pulses may be stored without transfer, and then serial transfer of each of the pulse transitions may be made into longer storage.

The apparatus includes an input counter, an output counter, an adder operated to subtract, and a latched gate connected between the adder and the output counter to stop the output counter when the counts of the two counters are equivalent. The output counter is connected to a register which continuously stores the states of the lowest order of the output counter.

A second register may be added to store an output of the adder. A modulator may then also be added to insert a centrally located pulse of intermediate amplitude, which indicates the storage of multiple pulses. The output of the modulator is made available to an oscilloscope.

A second latch gate may also be added to prevent spurious radio frequency bursts from over-running the input storage counter.

DESCRIPTION OF THE PREFERRED EMBODIMENTS

Figure 1:
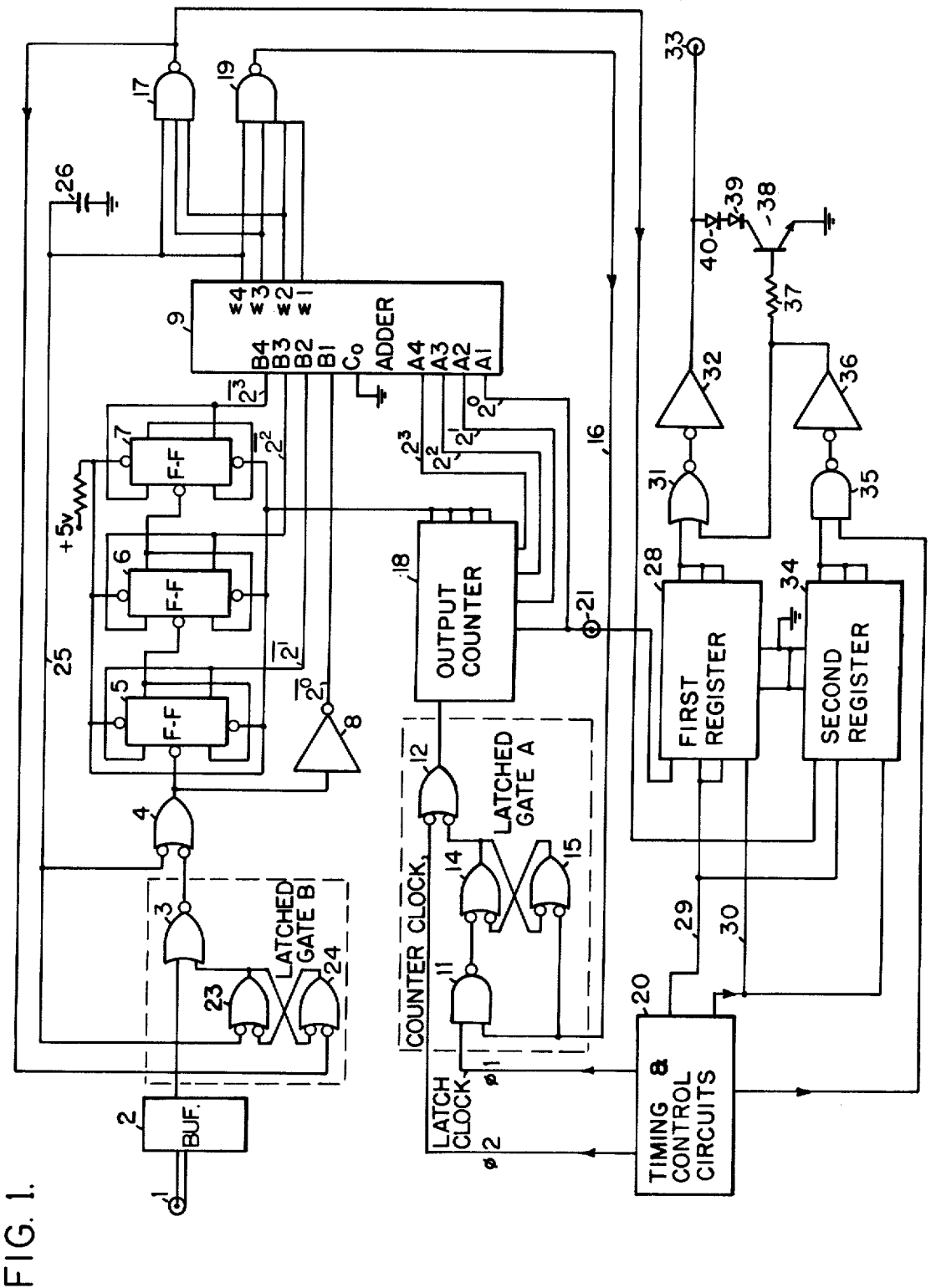
FIG. 1 is a schematic logic diagram of one channel of the high speed counter of this invention, including all output circuits.

In FIG. 1, numeral 1 indicates a coaxial input terminal to which one line carrying digital data from any device to be tested is attached. Buffer 2 accepts the digital input and provides current to drive NOR gate 3.

The output of the buffer passes through latched gate B without encountering any gating functioning thereof, save under special situations to be later described. Specifically, the buffer output passes into one terminal of a two input terminal NOR gate 3, the output of which passes into one input of a two-terminal negative-OR gate 4. The former gate may be embodied by a Ser. No. 74S02 integrated circuit and the latter gate by a Ser. No. 74S00.

Flip-flops 5, 6, 7 comprise a high speed input counter, being typically embodied in 74S112 integrated circuits. The series connection of these three flip-flops to form the counter and provide $2^1$, $2^2$, & $2^3$ outputs is known. Inverting amplifier 8, a Ser. No. 74S04, is connected to the output of gate 4 and provides the $2^0$ output.

The recited power-of-two outputs enter inputs B1 through B4, respectively, of adder 9. Since these are in inverse phase with respect to A1 through A4 inputs to be later described, the adder acts to subtract. A Ser. No. 74283 integrated circuit embodies the adder. Terminal Co is grounded.

Phase 1 of a latch clock enters latched gate A, as does also a phase 2 clock; the former to NAND gate 11 and the latter to negative-OR gate 12. Both may be Ser. No. 7400 IC's.

These clock pulses may originate from a known timing and control circuits entity 20. This entity may be externally adjustable as to frequency, so as to give various time scales to the reproduced data. A minimum frequency to keep known counters and registers operative is required, such as 10 kilohertz and a maximum of one megahertz, as limited by the response of registers 28 and 34.

Phase 2 pulses follow phase 1 by 180 electrical degrees in order to allow settling of the circuits clocked before information is entered therein. The several outputs of entity 20 are always at the same frequency although this is typically arranged to be adjustable by the operator.

Latched gate A is significant interconnecting logic that largely controls the functioning of the whole device. Besides gates 11 and 12, previously mentioning these elements above, the latched gate includes cross-coupled negative-OR gates 14 and 15, both of the Ser. No. 7400 type. Additionally, the output of gate 11 enters one input of gate 14, and both gates 11 and 15 receive the same "data clock enable" signal via conductor 16. This comes from four-input NAND gate 19, which in turn derives its inputs from adder 9. Latching is provided by a connection from the output of gate 14 to an input of gate 15, and the output of gate 15 to an input of gate 14.

The output of latched gate A, from gate 12, passes to the input of output counter 18. This is typically a Ser. No. 74163 integrated circuit, having four outputs that supply $2^0$, $2^1$, $2^2$, and $2^3$. These outputs form the second group of inputs to adder 9; A1 through A4.

When new input pulses come in to the high speed counting means 5, 6, 7, a non-equivalent state is set up at the output of adder 9; which then operates on latched gate A, allowing clock pulses at the input of that gate to come through and again advance output counter 18.

The output of adder 9 appears at four terminals, summation ($\Sigma$) 1 through 4, and is the output digital number representing the number of transitions stored in the input counter 5, 6, 7 that have not yet been transferred to output counter 18. All of the summation terminals are connected to the input of four-input NAND gate 19, the output of which connects to the data-clock-enable conductor 16.

When all of the transitions stored in the input counter 5, 6, 7 have been transferred to output counter 18 the summation signals 1 through 4 are all positive, indicating an equivalent state of the two counters. Then NAND gate 19 produces a low output state at the line 16 (data-clock-enable). This causes latched gate A to close and prevents advancement of the output counter. This equivalent state causes the $2^0$ output of counter 18 to be at the identical digital level as the unknown input level at 1 until the input changes again.

The data output of the essential apparatus according to this invention appears at terminal 21, which is the $2^0$ output of counter 18.

The reliability of the basic circuit above-described can be enhanced by providing latched gate B. It performs the function of limiting the over-run of incoming pulses into high speed counter 5, 6, 7, thus prohibiting accidental clearing of this counter between successive pulses of the output counter. It is further latching interconnecting logic.

As an example, with a 4 bit counter on the input, utilizing three flip-flops and the original signal as the 4th bit, if exactly 8 pulses occurred between output clock pulses and did not therefore appear on the output because of this timing, then the input counter would go back to the same state in which it was before the 8 pulses entered the input. When the next clock pulse occurred the equivalent state would still be valid and there would be nothing changing in the output. In this case these 8 pulses would never be recorded and would not be available for display.

A "radio-frequency burst" is an example of an 8 pulse sequence (the first 8 pulses thereof). Such an abnormality in the device under test is a known phenomenon and one that it is very desirable to detect and to subsequently eliminate from the device under test by appropriate circuit or operating changes.

The "straight-through" path of incoming digital data through latched gate B has been described. The other elements include cross-coupled negative-OR gates 23 and 24, which are also embodied and connected as has been described with respect to latched gate A.

The $\Sigma 4$ output of adder 9 is returned to latched gate B, via high-frequency-load-limit conductor 25. This conductor is shunted to ground by capacitor 26, necessary to remove spurious spikes originating in adder 9, which would otherwise enter the input signal channel and be treated as spikes from the device under test. A capacitance of the order of 330 picofarads is satisfactory for the embodiment being considered.

Conductor 25 is connected to an input of negative-OR gate 23. Thus, when the $\Sigma 4$ output of adder 9 switches to logic 0, indicating four untransferred pulses stored in high-speed-counter 5, 6, 7, gate 23 output is jammed to logic 1 and gate 24 output switches to logic 0, which then latches gate 23 output to logic 1. Gate 23 output is connected to NOR gate 3 input. Thus, a logic 1 jams NOR gate 3 and prevents additional input signals from over-running the high-speed-counter 5, 6, 7 as described earlier.

Conductor 25 is also connected to one of the inputs of negative-OR gate 4. This accomplishes a redundant stoppage of high-speed-counter 5, 6, 7 for the minimum propagation time to stop the high-speed-counter. This eliminates a possible borderline condition in which extra-fast gates at 3 and 4 could permit radio-frequency bursts from over-running counter 5, 6, 7 during the propagation delays of adder 9, as delayed by capacitor 26, gate 23 and gate 3.

The function of the whole latched gate B is to close the input 1 to further transitions as soon as a predetermined number, say 8, have occurred. These are sufficient to identify the nature of the spurious input, but not sufficient to cause an over-run of the high-speed-counter.

A further enhancement of the basic circuit of this invention involves the addition of a first register 28, which may be of the P2405 type capable of handling 1024 bits. A typical use for the invention is to supply a display of a fault of digital apparatus under test upon an oscilloscope. This register, attached to the basic output, assembles additional signals together with the basic data for suitable display on an oscilloscope.

A "load" command is impressed upon register 28 via conductor 29. This command originates at the timing and control circuits 20. A logic 1 load command enables new data to be loaded into register 28. Upon the detection of a fault in the device under test, control circuits 20 switches the "load" command to logic 0. This causes register 28 to switch to the recirculating mode.

A shift clock is supplied on conductor 30 to register 28 from timing and control circuits entity 20, as shown in FIG. 1. This keeps the register activated in a known manner. For the type of register specified the frequency of the clock must be at least 10 kilohertz to retain the data in the register. It may be up to the order of one megahertz. Selected frequencies in this range enable the operator to choose the time scale at which the input transitions are at first stored and then reproduced for viewing.

The single output of register 28 is formed from three outputs connected together. This is a known output drive configuration peculiar to the P2405 register. Known power input and ground connections are also provided for actuating the register.

The output of register 28 enters one input of a two-input NOR gate 31, which may be a SN74L02, then to isolating inverting amplifier 32, a SN74H04, and then to output terminal 33.

A still further enhancement of the basic circuit of this invention involves the addition of a second register 34, which may also be of the P2405 type capable of handling 1024 bits. This register, along with certain auxiliaries, inserts a "marker" pulse of short duration and intermediate amplitude between logic 0 and logic 1 upon certain pulses in the read-out of the stored data. This indicates that there was more than one pulse in storage at the time pertinent to the display of such pulses, such as would occur if a train of radio-frequency pulses had occurred in the input signal under analysis.

The input to register 34 is taken from the output of NAND gate 17. The register is actuated when the data bit is 1. This occurs when the Σ2, 3, or 4 output of adder 9 is at logic O. This condition indicates a full pulse remaining in the high-speed counter 5, 6, 7 after the transfer of the transition due to be clocked into register 28. Accordingly, a logic 1 is simultaneously clocked into register 34 to record this condition.

Register 34 is also provided with a shift clock input from conductor 30, power input and ground connections, and three terminals to one output; all as per prior register 28.

A "mark" pulse, narrower than the display period, is generated by the timing and control circuits 20.

The output from register 34 passes into one input of two-input NAND gate 35. The other input to that gate is the "mark" pulse from the timing and control circuits 20.

In the timing and control circuits 20 the phase 1 latch clock ends before the phase 2 counter clock to provide time for the latch gate to settle, so that a phase 2 counter clock will always be either completely blocked or completely transmitted by latched gate A. In other words, "clean" pulses will be transmitted therethrough.

The phase 2 counter clock in turn is timed so that the $2^0$ output of counter 18 is switched at that point during the shift clock when data input to the shift clock may be changed without affecting the data loaded therein.

The "mark" pulse is timed with its leading edge coincident with the trailing edge of the shift clock, and may have a duration of the order of 400 nanoseconds. A capacitor-resistor combination may be used to produce this narrower pulse. The phase 1 and 2 outputs may be produced by a combination of four one-shots and gates.

When the output from register 34 is passed by gate 35 it is amplified by inverter 36, a Ser. No. 7404, and through resistor 37, which may have a resistance of 1,000 ohms, to the base of transistor 38, a 2N2222. The emitter thereof is connected to ground and the collector is connected through two serially connected diodes 39 and 40 to data output terminal 33.

These elements function to bring down or up the potential of the data output terminal to an intermediate amplitude value between the normal digital 1 or 0; typically, half-way between these two values. These elements comprise digital-level-adjusting-means.

During the narrow "mark" clock the output of the second shift register 34 over-rides that of the first shift register 28, forcing the latter to a 1 state regardless of the original state at data output 33. This occurs through the second input to NOR gate 31.

At the same time, the output from second register 34 causes transistor 38 to conduct. A voltage drop occurs in diodes 39 and 40, this being such as to halve the potential between that representing a digital 1 and 0 (no voltage). Such marker pulses are shown at 60 and 61 in FIG. 3. They represent modulation to a given state.

Figure 2:
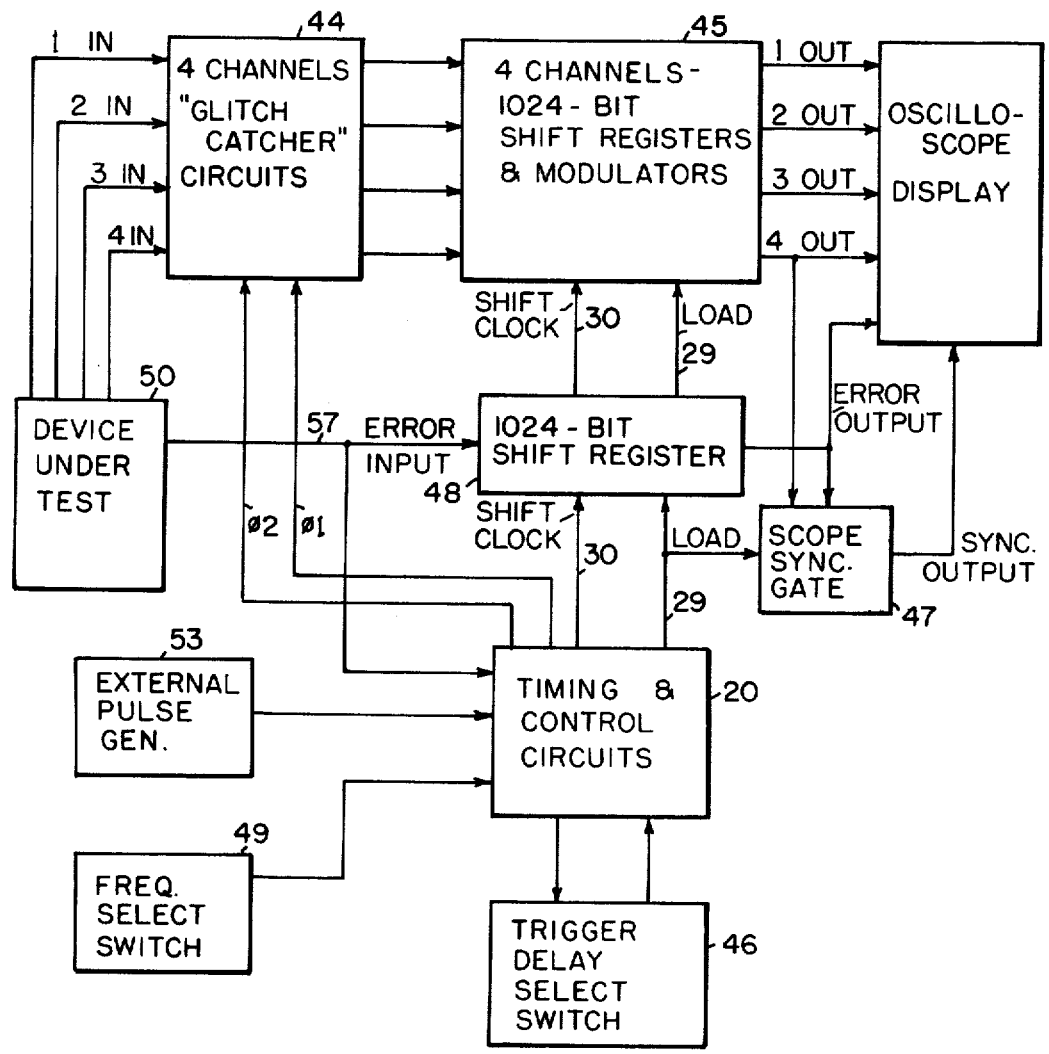
FIG. 2 is a block diagram of a previous events memory device employing plural high speed circuits according to this invention.

A complete block diagram of an apparatus for employing the essential circuit of FIG. 1 is given in FIG. 2.

Block 44 represents a plurality of the upper row of circuits of FIG. 1, as elements 1 through 19. Four such circuits are indicated, with the four lines of digital input. The plurality employed depends upon how many digital lines are to be monitored at once. The minimum is one, four is suitable, as is 12. Block 44 has been colloquially labeled "glitch catcher"; a "glitch" being commonly understood as a brief spurious pulse.

Block 45 represents the same plurality of lower row circuits of FIG. 1, as elements 20 through 40.

In operation, the outputs of block 44 are accepted by block 45 shift registers, which store the same in a continuous closed loop fashion as long as the device under test is operating in a normal manner. When an abnormality occurs and is detected by the timing and control circuits entity 20 the registers of block 45 stop loading and switch to recirculating mode. The outputs of block 45 may be monitored on an oscilloscope during all modes of operation.

It is to be noted that all of the circuits involved in accepting new data do so continuously, without even a nanosecond for reset time, or for any other "blind spot" time. However, once a malfunction occurs in the device under test, the previous events memory of this invention ceases to accept new data and retains the malfunction data for display.

A malfunction of the device or system under test 50 is considered to have happened when the "error input" 57 changes state.

An alternate known detection mechanism is the sampling of pulses such that a delay beyond a fixed time limit established by a retriggerable one-shot causes the timing and control circuits entity to generate an error signal.

Error input 57 is connected to timing and control circuits entity 20 and also to a separate register 48 for storage therein. Register 48 may be of the P2405 type with the usual known controls. The timing and control circuits entity 20 counts past the occurrence of the fault to a predetermined count that is selectable by trigger delay select switch 46. This is essentially a thumbwheel switch used to select from several possible timing points. A counter and a comparator are also used to give the switch setting electrical significance.

Upon reaching the predetermined count the timing and control circuits entity 20 switches the load signal on conductor 29 to logic 0. This causes all of the P2405 embodied shift registers in the entire apparatus of this invention to simultaneously stop loading new data and switch to the recirculating mode.

Additionally, the load signal, via conductor 29, is connected to oscilloscope synchronizing gate (scope sync gate) 47, so that the synchronizing output represents the error output signal upon recirculation of the data. Prior to the occurrence of the fault, the logic 1 load signal operated upon the scope sync gate to connect "data 4" output to the sync output. The synchronizing output is gated in this manner so that a dynamic system signal may be used for convenience in synchronizing an oscilloscope during no-fault operation.

When the system or device under test malfunction occurs, the outputs of block 45 become independent of the device under test. Thus, the switch to the recirculating error signal provides a continuously useful synchronizing pulse for monitoring the signals of the device under test throughout the time before and after the fault.

Figure 3:
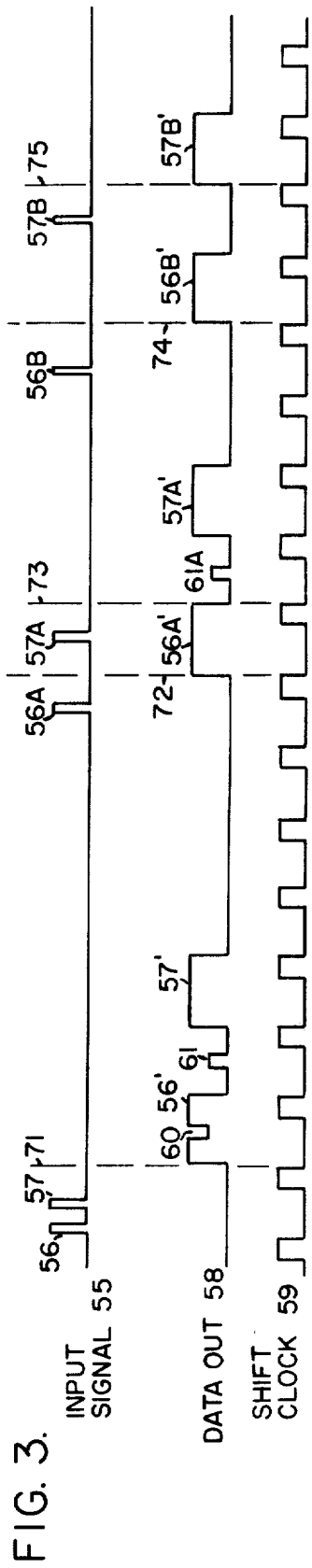
FIG. 3 shows digital waveforms pertinent to the operation of this invention.

The method of operation of the previous events memory of this invention is set forth further in connection with FIG. 3.

Input signal waveform 55 represents a single digital signal occurring in the device under test, this being in real time and including two "glitches" 56 and 57; i.e., very rapid spurious pulses created because of a malfunction. These may each have a duration of only a few nanoseconds.

Data out waveform 58 represents the same digital signal as reproduced; the glitches being the now longer-duration pulses 56' and 57'.

Clock pulses, waveform 59, are in this illustrative set of waveforms 1 microsecond apart. Thus, a time expansion of perhaps 5 to 1 is obtained. For slower clock pulses the time expansion is correspondingly greater.

In the first example at the left of waveform 55, "glitches" 56 and 57 both occur prior to the shift pulse 59 having a leading edge at time 71. This causes marker pulses 60 and 61 to be inserted in the dataout waveform 58. If there had been four rapid input pulses, as in a "radio-frequency burst", a marker pulse would appear on each of the first three output pulses of waveform 58, as well as at the logic 0 state after each of the three output pulses. Note that at the last output pulse 57' before a state of equivalence occurs does not have a marker pulse. Also, shift pulse 59 is an inverted pulse; as from + 5 v. to 0 v.

In the second example, "glitch" 56A occurs alone prior to time 72, causing an unmarked output pulse 56A'. Further in the example, during the time of output pulse 56A', a new "glitch" 57A occurs. This adds two more transitions to those in storage. The stored transitions prior to time 73 are; two in storage (56A) minus one out of storage (56A'), plus two more in storage (57A), equals three net transitions stored at clock time 73. This results in marker pulse 61A, as previously explained.

In the third example, "glitches" 56B and 57B, input pulses are shown sufficiently separated in time so as to avoid storing more than two transitions. Consequently, marker pulses are not supplied to the data-out pulses 56B' and 57B'.

From the above three examples the usefulness of the marker pulses will be recognized. The user is able to observe the final output of the previous events memory and identify pulses that occurred in rapid succession as distinguished from pulses that had greater separation in real time by the presence or absence of marker pulses and their locations.

The waveforms of FIG. 3 illustrate the case of positive pulses rising from a normally logic 0 level. This invention works equally well with normally logic 1 levels with negative pulses falling to logic 0. Any combination of positive and negative pulses is also acceptable to this apparatus.

An adjunct to the previous events memory device of FIG. 2 is external pulse generator 53. This acts as a versatile substitute for a pulse generator internal to timing and control circuits entity 20; the internal generator typically having only a few fixed pulse frequencies. On the other hand, external generator 53 may provide a continuous band of available pulse frequencies within the range of the practical example previously given, of from 10 kilohertz to 1 megahertz. The duty cycle of the pulse waveform may be any desired value within the range of from 10 to 50percent.

Figure 4:
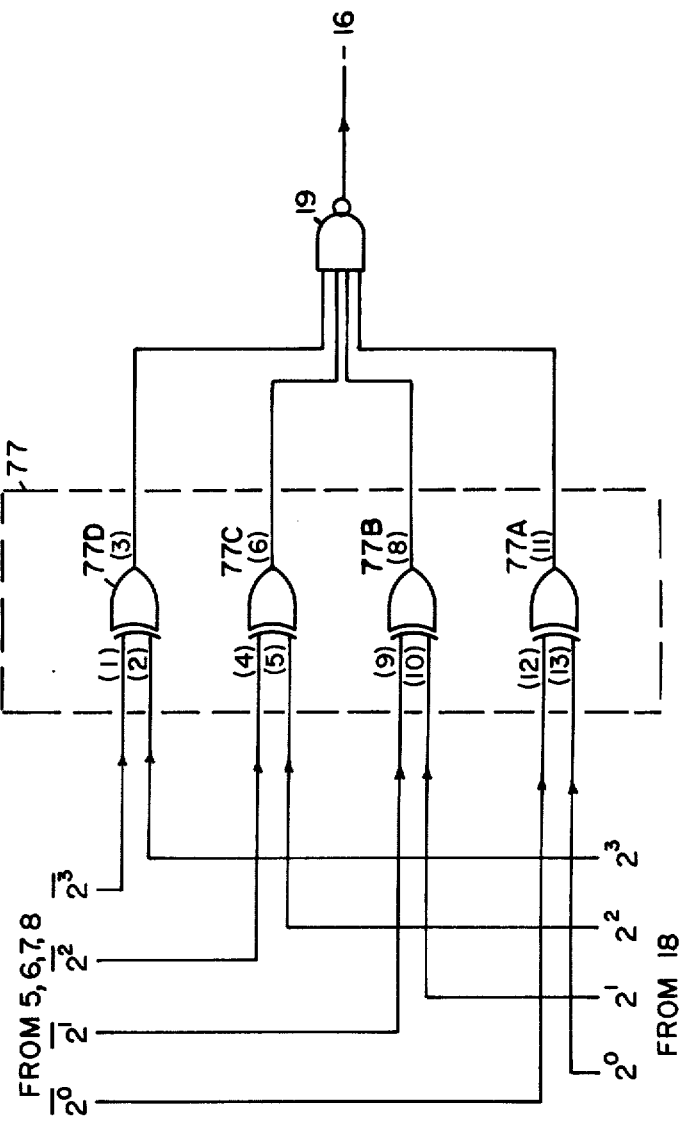
FIG. 4 shows an "exclusive-OR" gates alternate embodiment of the means-to-compare of the high speed counter.

In the alternate embodiment of FIG. 4 a group of four "exclusive-OR" gates replaces adder 9 in FIG. 1. The eight inputs designated as powers of two and the four summation outputs are directly connected to the group of gates in the same way as before. The group of gates may be embodied in a type Ser. No. 7486 integrated circuit; designated 77 in FIG. 4.

The output conductor carrying the $2^0$ digital output from the highspeed-counter 5, 6, 7 is connected to the (12) terminal of IC 77. In a similar way the output conductor carrying the $2^0$ digital output from output counter 18 is connected to terminal (13). These both enter exclusive-OR gate 77A, having an output terminal (11).

When these inputs are logic 0 and 1, respectively, the output is logic 1.

In the same manner the $2^1$ at input 9 of gate 77B, at logic 0, and $2^1$ at input 10, at logic 1, produce a logic 1 at output 8.

In the same manner the $2^2$ at input 4 of gate 77C, at logic 1, and $2^2$ at input 5, at logic 0, produce a logic 1 at output 6.

In the same manner the $2^3$ at input 1 of gate 77D, at logic 0, and $2^3$ at input 2, at logic 1, produce a logic 1 at output 3.

These four outputs connect to the inputs of four-input NAND gate 19 in the same manner as this gate received inputs in the circuit of FIG. 1. In this example all of the inputs are logic 1, therefore the output of gate 19 is logic 0.

Logic 0 at the output of gate 19 is the indicator of the state of equivalence. This state stops all output transitions. It occurs only when the outputs of output counter 18 is an exact complement of the outputs of highspeed-counter 5, 6, 7 and 8.

If the state is not equivalence, logic 1 appears at the output of gate 19 and output counter 18 continues to count.

Both the adder 9 and the exclusive-OR group of gates constitute means-to-compare, or, stated differently; comparison means.

Also, the lowest order of output count mentioned in the Summary of the Invention herein may be termed the least significant bit.

I claim:

1. The method of uninterruptedly storing and then retrieving an unlimited series of input digital electrical signal transitions subsequent to the occurrence of the same in real time, which includes the steps of;
   a. electrically digitally counting the number of transitions of said input digital electrical signal,
   b. separately electrically digitally counting internally generated pulses,
   c. comparing the count of said transitions of said input signal with a separate digital count of said internally generated pulses to detect nonequivalence between these two counts,
   d. periodically advancing the count of said internally generated pulses as long as nonequivalence exists between said two counts,
   e. terminating the advance of count of said internally generated pulses as soon as said two counts become equivalent, and
   f. utilizing the least significant bit of said count of said internally generated pulses as the digital output signal.

2. The method of claim 1 which includes the additional steps of;
   a. separately serially storing successive states of said digital output signal,
   b. comparing the count of said input transitions with the count of said internally generated pulses to detect a preselected minimum number of said stored input transitions not yet transferred into said count of said internally generated pulses,
   c. storing a given digital state whenever said preselected minimum number of untransferred input transitions is detected, and
   d. displaying said least significant bit of said count of said internally generated pulses to represent the original signal in real time, modulated with an intermediate amplitude state to indicate the preselected minimum number of untransferred transitions.

3. Apparatus for continuously storing digital data subject to subsequent retrieval, comprising;
   a. high speed digital counting means (5, 6, 7) to accumulate a record of digital input signal transitions upon a single digital line,
   b. a source of clock pulses,
   c. separate digital counting means (18) connected to said source of clock pulses to provide a series of transitions of its least significant bit to constitute the digital output signal representing the original real-time input levels,
   d. digital comparison means (9, 19) to produce an output related to an equivalence in counts between said high speed digital counting means and said separate digital counting means, and
   e. latching interconnecting logic (A) to cause said separate digital counting means to stop counting whenever said digital comparison means indicates that said high speed digital counting means and said separate digital counting means are at an equivalent count.

4. The apparatus of claim 3, in which;
   a. said digital comparison means is a digital subtraction means (9).

5. The apparatus of claim 3, in which;
   a. said digital comparison means is a group of exclusive-OR gates (77),
   a separate input of each which is connected to corresponding levels of the outputs of said high speed digital counting means (5, 6, 7) and of said separate digital counting means (18).

6. The apparatus of claim 4, which additionally includes;
   a. further latching interconnecting logic (B) connected between said digital subtraction means (9) and said high speed digital counting means (5, 6, 7)
   to limit the total number represented by the outputs of said digital subtraction means
   to a number that is less than the total capacity of said high speed digital counting means
   by inhibiting further input thereinto;
   and to remove the inhibition when said number is reduced to a predetermined lower number.

7. The apparatus of claim 4, which additionally includes;
   a. first register means (28) connected to said least significant bit output line (21) of said separate digital counting means
   to store successive states thereof,
   b. second register means (34) connected to said digital subtraction means (9) to store digital data relating to the range of digital output states thereof, and
   c. modulating means (35 to 40 & 31, 32) to combine the outputs of said second register means with that from said first register means
   to provide marker information in the output from said first register means
   that relates to the quantity of untransferred digital transitions stored in said high speed digital counting means.

8. The apparatus of claim 7, in which said modulating means comprises;
   a. gate and inverter means (31, 32) connected to the outputs of said first and second register means
   to selectively establish a digital "one" level at the output of said gate and inverter means (31, 32), and
   b. clamping means (38-40)
   to bring the level at the output of said gate and inverter means to a level between said "one" level and "zero" level.

* * * * *